Nov. 2, 1954
J. T. GONDEK
2,693,396
MACHINE TOOL WAY
Filed April 19, 1951
3 Sheets-Sheet 1
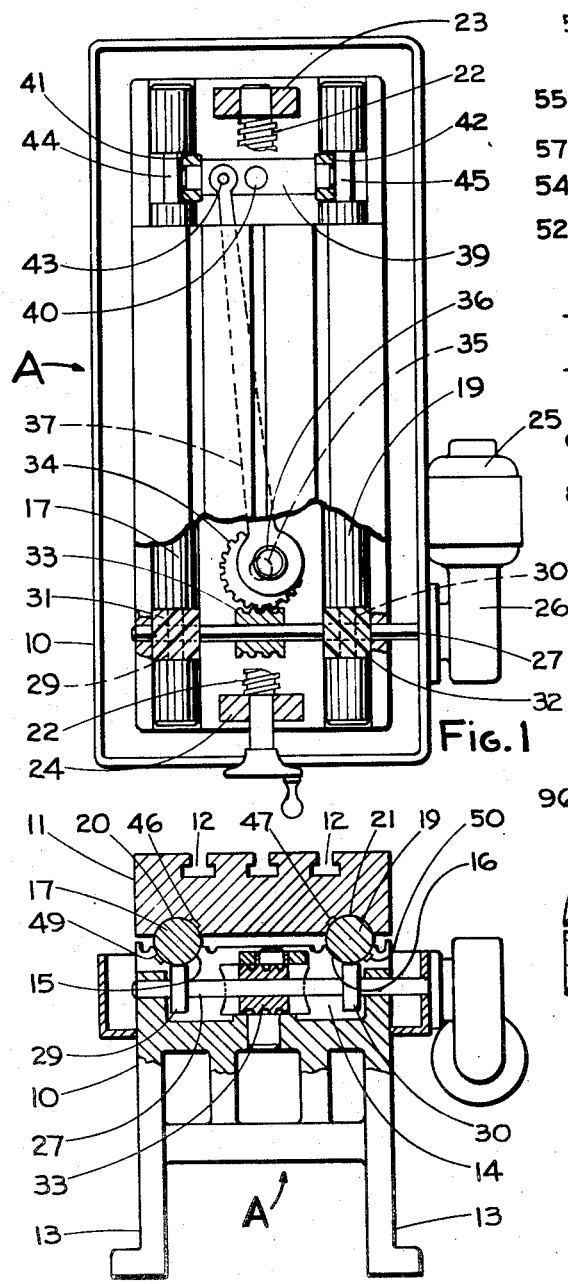
Fig. 1
Fig. 2
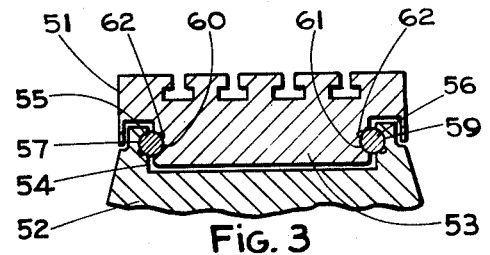
Fig. 3
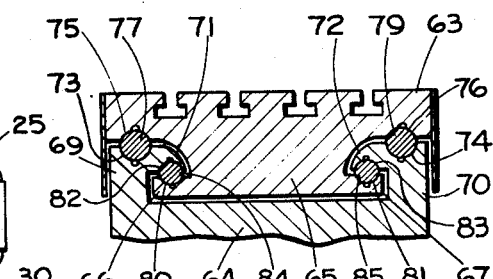
Fig. 4
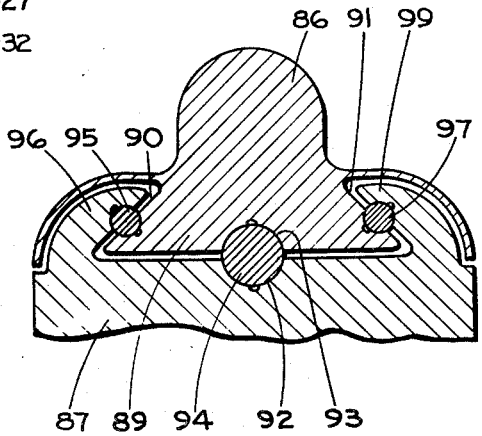
Fig. 5
INVENTOR
John T. Gondek
BY Robert M. Dunning
ATTORNEY

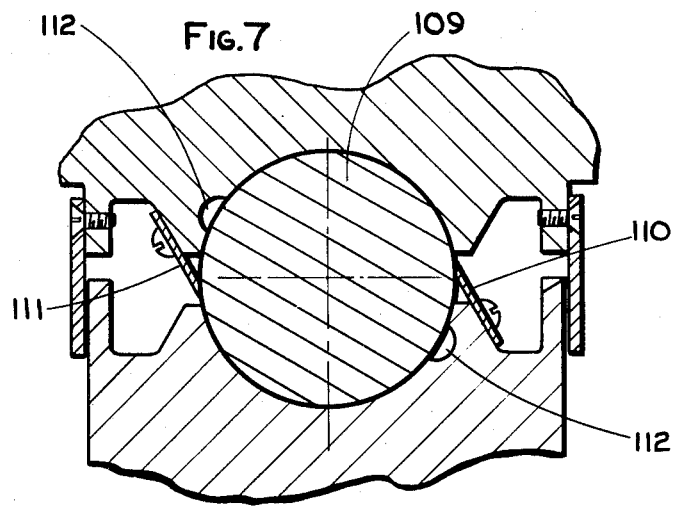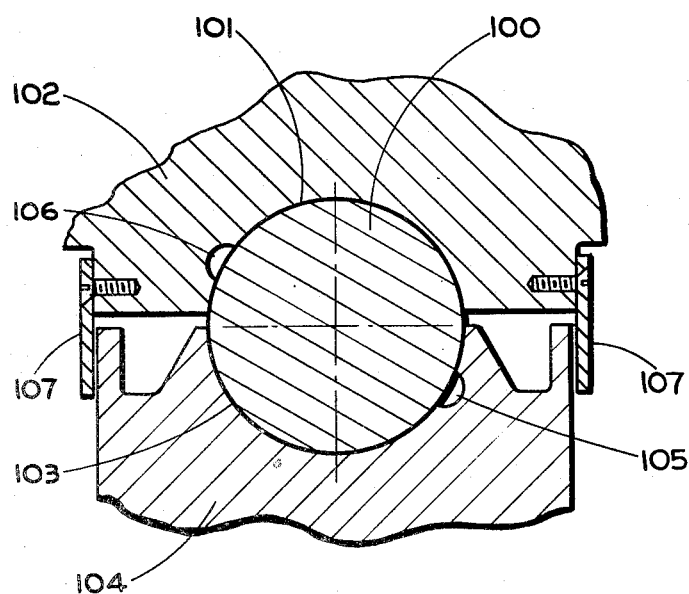

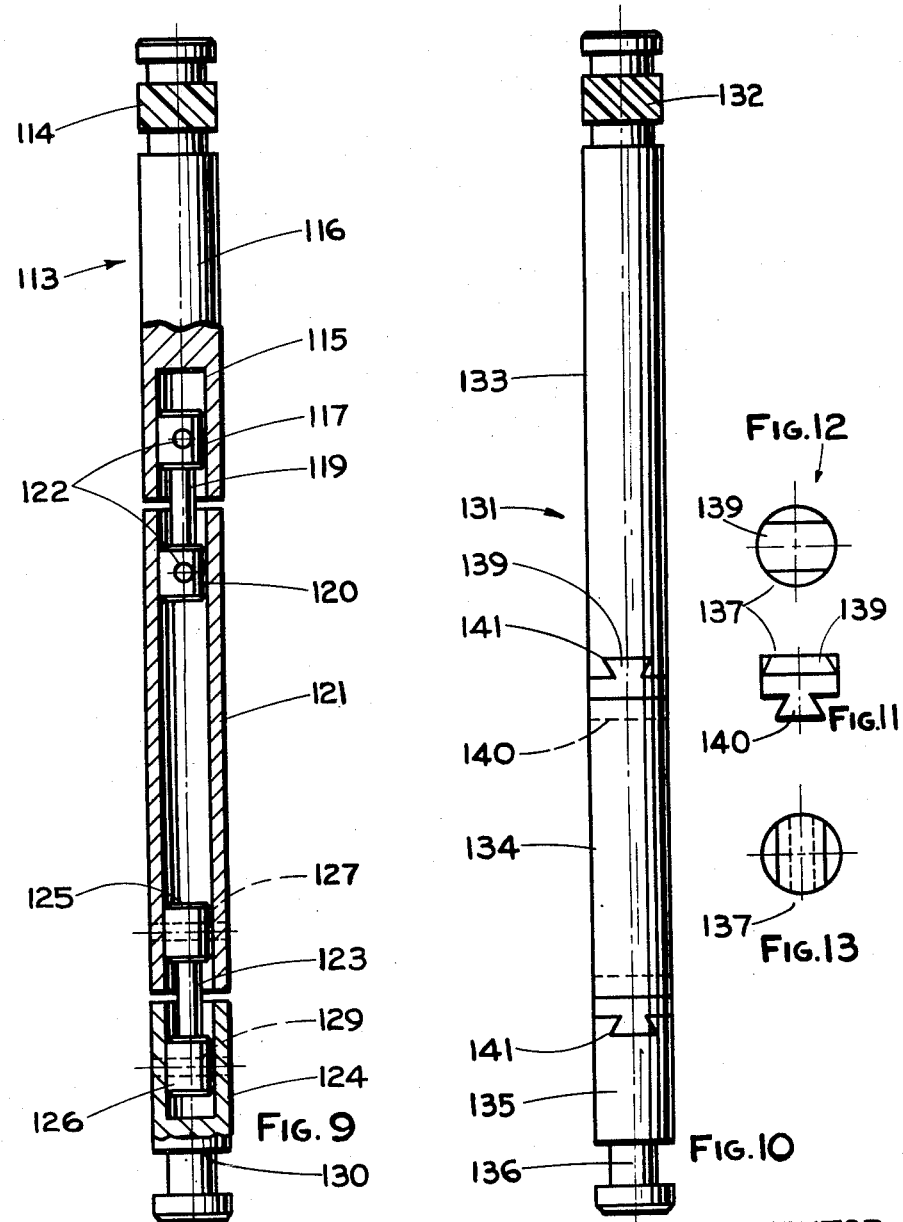

United States Patent Office 2,693,396
Patented Nov. 2, 1954

2,693,396

MACHINE TOOL WAY

John T. Gondek, Minneapolis, Minn.

Application April 19, 1951, Serial No. 221,779

9 Claims. (Cl. 308—3.5)

My invention relates to an improvement in machine tool ways such as are found on practically all machine tools.

The machine tool industry is experiencing great difficulty in building tools capable of manufacturing parts to the close tolerance required by the new high-speed machines being designed today. One of the greatest obstacles in the path of the machine tool designers is the lack of slide or way that will move freely without minute jerks, that have the same or nearly the same frictional resistance to start motion of the slide as it takes to keep it in motion. The slide should also ride in the same path at all speeds and remain in that path when at rest.

Attempts have been made with the so-called anti-friction bearings of both the ball and roller type and their many shortcomings and failure to even come close to the desired is well known to designers and users alike. The ways to which my invention relates solve the above mentioned problems to a degree that will suffice for several years to come. Additional features of lesser importance are: uniform wear reduced to a minimum, self cleansing and ease of manufacture.

A feature of the present invention resides in the provision of tool ways in the form of cylindrical bars. These bars are engaged in substantially semi-circular grooves in the fixed base of the tool and in similar grooves in the movable table or bed of the tool. Means are provided for moving the cylindrical bars as the tool is used. As a result a film of oil may be readily maintained on the bars in spite of the weights and pressures involved.

A feature of the present invention lies in the provision of a way comprising one or a series of elongated bars arranged in parallel relation and over which the movable portion of the tool may reciprocate. Oil is usually supplied through an oil groove in one or both of the relatively movable parts throughout the length of the bars. Means is provided for rotating the bars about their longitudinal axis. As a result the film of oil supplied through the oil groove or grooves is distributed throughout the circumference of the bars, thereby maintaining a constant film of oil on the ways.

A further feature of the present invention resides in the provision of elongated rotatable bars forming parts of the ways of machine tools. By constantly rotating the bars during the operation of the tool, a new surface of the bar constantly bears against the grooves in which the bars are located, thereby decreasing the wear on the various parts and causing the wear which does take place to be evenly distributed.

An added feature of the present invention resides in the provision of machine tool ways which include elongated rotatable bars provided with means for rotating the bars about their axes and in the further provision of a means of reciprocating the bars as they rotate to further distribute wear and to further distribute the oil film on the bars. By changing the relative location between the rotatable bars and the relatively slidable machine tool parts, the danger of uneven wear on the various parts is lessened and the oil film on the various parts is spread more effectively.

These and other objects and novel features of my invention will be more clearly and fully set forth in the following specification and claims.

In the drawings forming a part of my specification:

Figure 1 is a top plan view partly in section of a machine tool showing the construction thereof.

Figure 2 is a vertical sectional view through the structure illustrated in Figure 1.

Figure 3 is a diagrammatic sectional view through a modified form of construction showing the means of supporting a movable tool bed which is subject to considerable lateral strain.

Figure 4 is a sectional view through another type of bed showing a modified manner of supporting a movable tool bed.

Figure 5 illustrates a modified form of bed mounting.

Figure 6 is an enlarged sectional view through a machine tool way showing the arrangement of parts therein.

Figure 7 is a view similar to Figure 6 showing doctor blades or scraper blades for removing excess oil from the way.

Figure 8 is a plan view of one of the rotatable cylinders illustrated in the mechanism of Figures 1 and 2.

Figure 9 is a plan view partly in section of a modified form of cylinder bar.

Figure 10 is a plan view of another modified form of cylinder bar used in machine tool ways.

Figure 11 is an elevation view of a connecting element used in connecting adjoining parts of the cylinder bar structure shown in Figure 10.

Figure 12 is an end view showing one end of the connector illustrated in Figure 11.

Figure 13 is an end view showing the other end of the connector illustrated in Figure 11.

The ways which form a part of the present invention may be used on virtually any type of machine tool having slidable elements. The tool A in Figures 1 and 2 of the drawings may comprise a milling machine or the like having a supporting base frame 10 and a movable bed or table 11. The bed or table 11 is shown as including parallel elongated T-shaped slots 12 which are useful in forming a means of supporting an object to be worked upon. The particular nature of the table is not of great importance in the present invention.

The base or frame 10 is shown as having supporting legs 13 and a frame body having a recess or cavity 14 in its upper surface. A pair of elongated grooves 15 and 16 which are substantially semi-cylindrical in section extend the length of the base 10 in the upper surface thereof. The grooves 15 and 16 are parallel and are designed to accommodate elongated cylindrical bars 17 and 19.

The table or bed 11 is slidably supported upon the bars 17 and 19 and is provided along its undersurface with substantially semi-cylindrical grooves 20 and 21 designed to accommodate the upper surface of these bars 17 and 19. Thus the bed 11 is slidably supported for movement longitudinally of the base 10.

As indicated in Figure 1 of the drawings a feed screw 22 is supported by suitable bearings 23 and 24 on the base 10 and is engageable with a threaded member on the bed 11 to move the bed. The structure of this feed screw and its drive mechanism is not illustrated in detail as this arrangement is common in the art.

Mounted upon one side of the base frame 10, I disclose a drive motor 25 which is connected to any suitable source of current supply and which may preferably be actuated continuously when the milling machine is in operation. The motor 25 is connected to a gear reduction unit 26 which in turn drives a transversely extending shaft 27. This shaft 27 is provided with a pair of helical gears 29 and 30 which are in mesh with helical gear teeth 31 and 32 respectively on the bars 17 and 19. Rotation of the shaft 27 thus acts to drive the bars 17 and 19 in a rotative direction, one shaft rotating in a clockwise direction and the other preferably rotating in the opposite direction. A gear 33 is also mounted upon the shaft 27 between the gears 29 and 30. The gear 33 is in mesh with a gear 34 mounted upon a vertical axis 35. A pivot 36 is eccentrically supported upon the gear 34. An eccentric arm 37 is supported upon the pivot 36 and is reciprocated by rotation of the eccentric pivot 36 with the gear 34.

A lever 39 is pivotally supported at 40 intermediate the bars 17 and 19. Rollers 41 and 42 are rotatably supported on aligned pivots at opposite ends of the lever 39. This lever 39 is rocked or oscillated about its pivot 40 by pivotal connection at 43 with the eccentric arm 37. Thus upon rotation of the gear 34, the eccentric arm will be reciprocated in such a manner as to rock the lever 39, first in one direction and then in the other.

The bars 17 and 19 are provided with reduced diameter portions 44 and 45 near one end thereof. These reduced diameter portions form grooves about the bars 17 and 19 which are designed to accommodate the rollers 41 and 42 respectively. Oscillation of the lever 39 thus acts to reciprocate the rods 17 and 19. Thus these rods are reciprocated as they rotate, providing a new surface in engagement with the relatively slidable parts of the milling machine.

The structure thus defined has several advantages over other types of ways. In the first place when a milling machine or similar machine tool has been idle for a short period of time, the two relatively slidable parts tend to stick together thus requiring abnormal force to start them in operation. As a result the movable portion of the structure sometimes does not actually start into operation smoothly, but actually jumps ahead when sufficient force is exerted to overcome the tendency of the movable part to remain fixed. This uneven movement has a very definite disadvantage and impairs the quality of the work being done.

The tendency of the movable part of the machine tool to stand still also is found to a lesser extent each time the movable table changes direction. I have found that when the ways themselves rotate in the manner described, the tendency of the movable bed or table to stick in any position is to a large extent eliminated. As a result the table moves more smoothly than would otherwise be possible.

In order to properly lubricate the ways during operation thereof, I provide a pair of longitudinally extending oil grooves 46 and 47 in the bed or table 11. Oil is urged under pressure through these grooves 46 and 47 during operation of the lathe. The surface of the ways is accordingly completely lubricated at all times so that a surface film of oil always coats the surface of the bars 17 and 19. Grooves 49 and 50 are similarly provided in the frame portion 10 of the apparatus, these grooves also serving as a means of providing a film of oil on the bars. It is difficult to maintain ways of the usual type properly lubricated in view of the fact that the ways are relatively long and the longitudinal travel of the table 11 is usually relatively short. However, by providing longitudinally extending lubricating grooves supplied with a proper lubricant the bars disclosed are at all times kept lubricated with little difficulty.

In Figure 3 of the drawings I disclose a machine tool having a movable bed or table 51 and a fixed frame 52. In this construction the table 51 is provided with a downwardly extending elongated central projection 53 which extends in a groove or channel 54 of the frame. Bars 55 and 56 are provided in semi-circular grooves in the side walls between the channel sides and the projection 53. Elongated grooves 57 and 59 are provided in the frame 52 on opposite sides of the channel and opposed semi-cylindrical grooves 60 are provided in the projection 53. The bars 55 and 56 are engaged in these semi-cylindrical grooves so as to properly support the movable element 51 of the apparatus.

This type of construction is particularly advantageous where side thrust is high. Means similar to that illustrated in Figures 1 and 2 of the drawings are provided for rotating the rods 55 and 56 and similar means may also be provided for oscillating the bars during rotation thereof. Thus the bars may be rotating and oscillating continuously during operation of the apparatus. Longitudinally extending oil slots or grooves such as 62 are provided to facilitate the lubrication of the bars during rotation and reciprocation.

In Figure 4 of the drawings I disclose another modified form of construction in which a movable bed or table 63 is mounted for sliding motion upon a base frame 64. In this form of construction the bars which form the ways are so arranged as to permit a vertical force to be readily resisted regardless of whether the force is upwardly or downwardly. The movable part 63 is provided with a downwardly projecting portion 65 provided with two laterally extending flanges 66 and 67 on opposite sides thereof. The base 64 is provided with spaced upwardly extending sides 69 and 70 which terminate in inwardly extending flanges 71 and 72. Semi-cylindrical longitudinally extending grooves 73 and 74 are provided in the upper surface of the frame 64 and similar semi-circular grooves 75 and 76 are provided in the relatively movable member 63. Cylindrical rods 77 and 79 are supported in these grooves to provide a support for the movable part 63.

A second set of semi-cylindrical grooves 80 and 81 are provided in the upper surface of the flanges 66 and 67 and cooperable semi-cylindrical grooves 82 and 83 are provided in the inwardly extending flanges 71 and 72. Bars 84 and 85 are provided in these cooperable grooves.

Means are provided similar to those previously described for rotating the various bars. Means are also preferably provided for reciprocating the bars longitudinally as they rotate. The bars 77 and 79 act to support the weight of the movable member 65 as well as the downward force exerted against the same. The bars 84 and 85 tend to resist upward force on the table 65. All of the bars are provided with longitudinally extending oil grooves associated therewith by means of which the various bars may be lubricated.

In Figure 5 of the drawings I disclose another arrangement of bars which may be employed between a movable machine tool part 86 and a fixed machine tool frame 87. In this arrangement the movable part is provided with a downwardly projecting lower portion 89 which is provided with inwardly tapering sides 90 and 91. A central semi-cylindrical groove 92 is provided in the frame 87 and a similar opposed groove 93 is provided in the movable member 86. A rotatable cylindrical rod 94 is mounted in the grooves 92 and 93 to support the weight of the movable member 86.

A cylindrical bar or rod 95 is located between the inclined wall 90 and the overlying portion 96 of the frame 87. A similar rotatable bar 97 is located between the inclined wall 91 and the overlying portion 99 of the frame. The bar 94 acts to support the weight of the movable member 86 while the bars 95 and 97 cooperate to withstand side thrust as well as upward thrust. All of the rods 94, 95 and 97 are rotatable and means are provided for rotating the various bars. Preferably the bars also may reciprocate longitudinally in the manner illustrated in Figures 1 and 2 of the drawings. Oil grooves are provided extending longitudinally of each of the bars so that the bars may be effectively lubricated as they rotate.

Figure 6 illustrates in enlarged detail a rotatable way 100 supported in a semi-cylindrical groove 101 of a movable member 102 and a cooperable semi-circular groove 103 of the frame member 104. Longitudinally extending oil grooves 105 and 106 lubricate the way as it rotates. Guides 107 tend to prevent foreign material from contacting the rotatable ways.

In Figure 7 of the drawings a construction is illustrated which is substantially identical with that disclosed in Figure 6, with the exception of the fact that the rotatable bar 109 in Figure 7 is provided with a pair of scraper blades 110 and 111 in engagement with opposite sides of the bar. The scraper blades tend to scrape dirt and other material from the surface of the bar as it rotates, while the longitudinally extending oil grooves 112 supply fresh clean oil for lubricating the ways.

In Figures 9 through 13 of the drawings, I disclose way bars which may flex somewhat between their ends. These bars include sections which may be removed and replaced if desired. The bar 113 includes a tooth portion 114 engageable with a cooperable gear to rotate the bar. A socket 115 is provided in an end of the gear section 116 for accommodation of the headed end 117 of a connector 119. The connector 119 is provided with a second head 120 extending in the hollow shaft section 121. Parallel pins 122 connect the two heads 117 and 120 to their respective shaft sections.

A connector 123 similar to the connector 119 connects the hollow shaft section 121 with the end section 124. The connector 123 is provided with two heads 125 and 126 which are pin connected at 127 and 129 to the various shaft sections. The pins 127 and 129 are parallel and are preferably arranged on a plane at right angles to a plane through the axes of the pins 122.

The rod section 124 is provided with an external groove 130 for accommodation of the means for reciprocating the rod. The way bar 131 includes a toothed end 132 for accommodation of a cooperable gear by means of which the bar may be rotated. The bar 131 is shown as comprising three sections 133, 134, and 135. The end section 135 is externally grooved at 136 to accommodate a rod reciprocating mechanism.

Connectors 137 of the type illustrated in Figures 11, 12 and 13 act to connect the sections of the rod 131. Each connector includes a projection 139 of wedge shaped formation and an opposite projection 140 of similar wedge shape. The wedge shaped projection 139 extends at right angles to the axis of the connector, while the projection 140 is arranged in a plane at right angles to a plane through the axis of the projection 139. Thus one portion of the connector is at right angles to the other portion thereof. The shaft sections are provided with wedge shaped grooves such as 141 to accommodate the various wedge shaped projections.

In accordance with the patent statutes, I have described the principles of construction and operation of my machine tool ways, and while I have endeavored to set forth the best embodiment thereof, I desire to have it understood that obvious changes may be made within the scope of the following claims without departing from the spirit of my invention.

I claim:

1. A machine tool including a base and a relatively slidable element supported by the base, said base and said relatively slidable element having a series of parallel grooves therein, the grooves being arranged in pairs, and each pair including a groove in the base and a groove in the relatively slidable element, and an elongated cylindrical support located between the grooves of each pair, said cylindrical element holding said relatively slidable element in spaced relation to said base, means for rotating said cylindrical elements, and means for reciprocating said cylindrical elements as they rotate.

2. The structure described in claim 1 and including an elongated oil groove communicating with at least one groove of each pair, said oil groove extending longitudinally of the first named grooves and designed to supply lubrication to the surface of said cylindrical elements.

3. A machine tool construction including a base portion and a relatively slidable portion supported by said base portion, and a sliding support between said base portion and said relatively slidable portion, said support including a pair of elongated cylindrical elements interposed between said base and said relatively slidable element, said base and said relatively slidable element having elongated grooves therein designed to accomodate said cylindrical elements and to support said relatively slidable element in spaced relation to said base for movement longitudinally of said cylindrical elements, and means for reciprocating said cylindrical elements.

4. The structure described in claim 3 and including means for rotating said cylindrical elements simultaneously in opposite directions of rotation.

5. The structure described in claim 3 and including means for rotating said cylindrical elements as they reciprocate.

6. The structure described in claim 3 and including means for rotating said cylindrical elements and means for simultaneously reciprocating said cylindrical elements in opposite directions.

7. A machine tool construction including a base portion and a relatively slidable portion supported by said base portion, and a sliding support between said base portion and said relatively slidable portion, said support including a pair of elongated cylindrical elements interposed between said base and said relatively slidable element, said base and said relatively slidable element having elongated grooves therein designed to accommodate said cylindrical elements and to support said relatively slidable element in spaced relation to said base for movement longitudinally of said cylindrical elements, the base and the relatively slidable element including adjoining substantially vertical walls, said cylindrical elements being supported between said substantially vertical walls.

8. A machine tool construction including a base portion and a relatively slidable portion supported by said base portion, and a sliding support between said base portion and said relatively slidable portion, said support including a pair of elongated cylindrical elements interposed between said base and said relatively slidable element, said base and said relatively slidable element having elongated grooves therein designed to accommodate said cylindrical elements and to support said relatively slidable element in spaced relation to said base for movement longitudinally of said cylindrical elements, said cylindrical elements being located between an upper surface portion of the base and a lower surface portion of the relatively slidable element, and in which the base and relatively slidable element include interlocking portions, the structure also including cylindrical elements between the upper surface of the interlocking portion of the relatively slidable element and a lower surface of the interlocking portion of the base.

9. A slidable support between a fixed base and a relatively slidable element, the base and the slidable element each having two spaced grooves therein in parallel relation, the grooves in the base being opposed to the grooves in the slidable element, an elongated cylindrical rod in each pair of opposed grooves, the rods supporting said slidable element in spaced relation to the base, means for rotating said rods, and means for reciprocating said rods as they rotate.

References Cited in the file of this patent

UNITED STATES PATENTS

| Number | Name | Date |
|--------|------|------|
| 643,190 | Lodge | Feb. 12, 1900 |
| 1,648,441 | Brower | Nov. 8, 1927 |
| 2,050,960 | Olivetti | Aug. 11, 1936 |
| 2,267,239 | Johnson | Dec. 23, 1941 |

FOREIGN PATENTS

| Number | Country | Date |
|--------|---------|------|
| 531,162 | Great Britain | Dec. 30, 1940 |